United States Patent [19]

Levington

[11] 4,105,087
[45] Aug. 8, 1978

[54] HYDRAULIC CAB TILTING SYSTEMS

[75] Inventor: Henry John Levington, Snelland, England

[73] Assignee: Clayton Dewandre Company Limited, Titanic Works, England

[21] Appl. No.: 784,465

[22] Filed: Apr. 4, 1977

[30] Foreign Application Priority Data

May 3, 1976 [GB] United Kingdom ............... 17933/76

[51] Int. Cl.² ............................................ B62D 23/00
[52] U.S. Cl. ................................. 180/89.15; 296/35 R
[58] Field of Search ................... 180/89.15; 296/28 C, 296/35 R, 35 A, 35 C; 91/400, 402, 415, 416; 254/93 R, 93 VA

[56] References Cited

U.S. PATENT DOCUMENTS

| 3,472,547 | 10/1969 | London | 296/28 C |
| 3,853,368 | 12/1974 | Eichelsheim | 180/89.15 X |
| 3,972,557 | 8/1976 | Hudston | 296/35 R |

Primary Examiner—Joseph F. Peters, Jr.
Assistant Examiner—Terrance L. Siemens
Attorney, Agent, or Firm—Norris & Bateman

[57] ABSTRACT

A hydraulic ram system for tilting a vehicle cab which is resiliently mounted on the vehicle frame includes a ram cylinder of which that end in which the ram piston is located when the cab is in the lowered position is of increased bore diameter to render the piston passive in this position, an auxiliary valve being provided in the upper ram line held by a spring-loaded detent in a closed condition and adapted to open when during a lifting operation the piston moves out of the increased bore zone.

3 Claims, 3 Drawing Figures

HYDRAULIC CAB TILTING SYSTEMS

The cabs of large commercial vehicles are often resiliently supported on the vehicle chassis and in addition are so mounted that they can be tilted forward by a hydraulic ram or jack to provide access to the engine and other mechanism. However, when the cab is in the lowered position the ram tends to act undesirably as a damper under the movements of the cab on its suspension, and where the ram is fitted with lock valves the cab could become positively locked to the chassis. In our prior U.S. Pat. No. 3,972,557, we have disclosed a manner of overcoming this problem by forming that end of the ram cylinder in which the piston is located when the cab is in its lowered position of increased bore diameter to provide a clearance around the ram piston sufficient to render the ram passive in this position, that is, the piston is free to 'float' and present no resistance to the movements of the cab on its resilient suspension.

In one system embodying such a ram construction the ram was raised from the floating or suspended condition by first setting valve means used to control operation of the ram to a position to allow pressure fluid to enter the lower end of the ram cylinder and thereby raise the piston to the upper end of the suspended zone, the upper ram line being blocked during this movement, and the valve means being then set to normal 'raise' position to effect movement of the ram over the operating zone where the piston moves in sealing engagement with the cylinder bore and during which movement the upper ram line is connected to reservoir. Previously these ram operations were effected by manual actuation of directional control valve means and the present invention provides auxiliary or supplementary valve means for controlling automatically the flow in the upper ram line, such that when the directional control valve is set to raise the cab, and the auxiliary valve operated, the complete operation is carried out without further manual control.

According to the invention, in a cab tilt system as above described, there is provided in the upper ram line an auxiliary valve which is adapted to be held by a spring-loaded detent in the closed position and the arrangement being such that when a predetermined pressure is reached in the upper end of the ram cylinder during a lifting operation and occasioned by the entry of the ram piston into the operative zone of said cylinder, said pressure acting on the valve overcomes the spring-loading on the detent and moves the valve to the open position.

Preferably, the detent means has a second operative condition where it holds the valve in the open position, means being provided for manually resetting the valve when desired, and such an embodiment will now be described with reference to the accompanying drawings, wherein.

Figure 1:
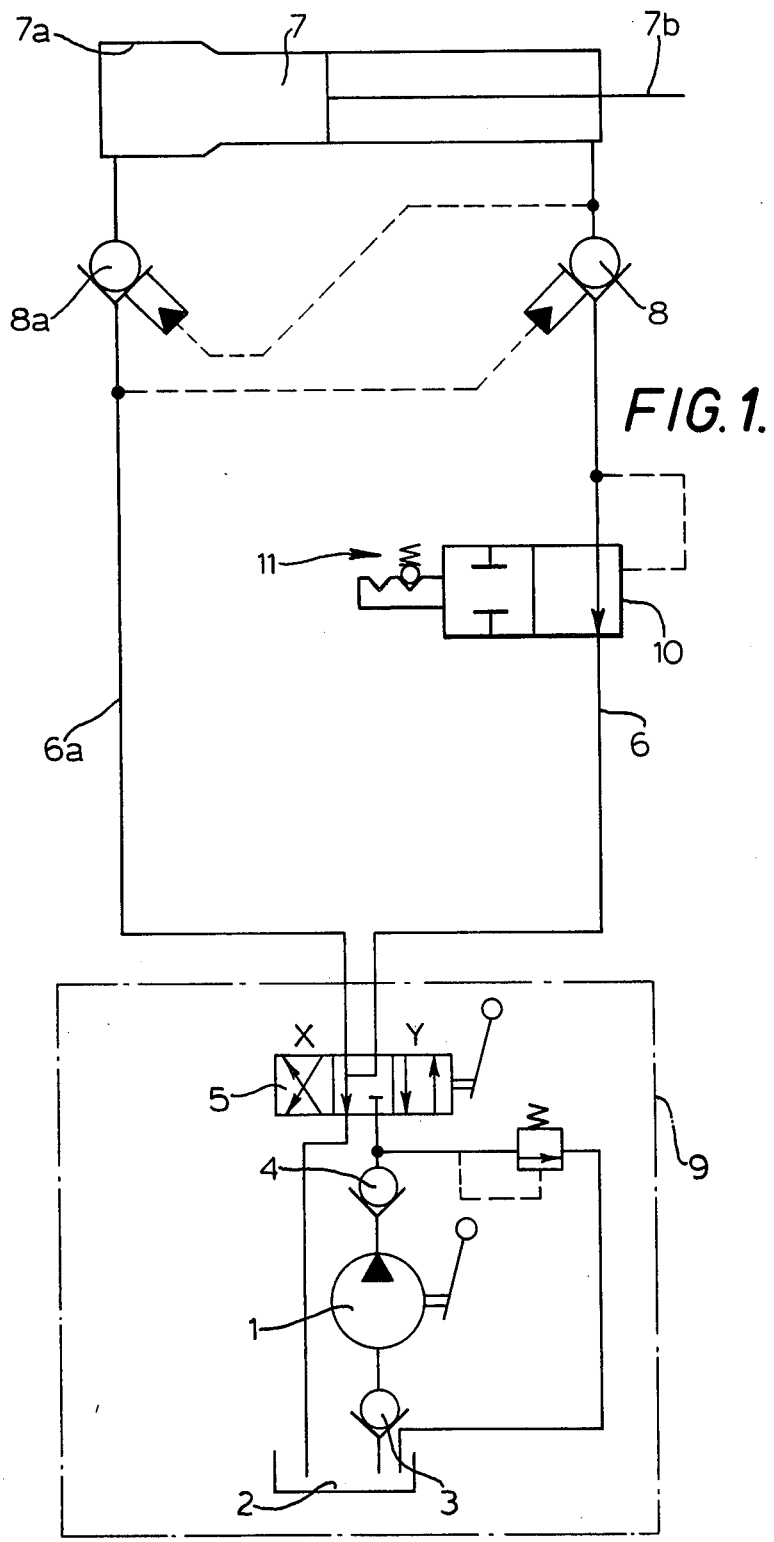
FIG. 1 is a circuit of the basic system and incorporating the improvements according to the present invention.

Referring first to FIG. 1, the system shown comprises a hand-operated pump 1 receiving fluid from a reservoir 2 past a check valve 3 and delivering the fluid under pressure past a further check valve 4 to a three-position hand-actuated control valve 5 which directs the pressure fluid selectively and via lines or conduits 6, 6a to the upper and lower ends respectively of the ram 7 constructed in accordance with said U.S. Pat. No. 3,972,557. The pump is provided in a conventional manner with a relief valve 1a. In the lines 6, 6a there are shown ram locking valves 8, 8a respectively, the valves depicted being typical pilot-operated valves, one in each ram port and each adapted to be held open by pressure established in the opposite end of the ram cylinder, but the system will work equally well if no valves are fitted or restrictors are fitted or with any practical combination of lock valve, open line and/or restrictor.

The pump 1, reservoir 2, control valve 5 and associated components enclosed withn the area indicated by the chain line 9 are formed as a unitary structure for mounting on a convenient point of the vehicle accessible to the driver or operator and when the cab is in the lowered position the ram piston is located in the floating or suspended zone, and as the vehicle is driven about in a normal manner movement of the cab on the spring suspension causes the ram piston to oscillate back and forth along the axis of the increased bore 7a of the ram. As the piston rod 7b moves out of the ram cylinder, fluid is sucked in through either of the valves 8, 8a (or restrictors where provided), and as the rod moves into the cylinder a small pressure is built up which opens lock valve 8a (or overcomes the restrictor) and passes oil to the reservoir via the control valve 5; thus the system offers negligible damping effect. If the control valve 5 is left in position Y fluid can flow freely to and from the reservoir to valve 8a (or the restrictor). If the said valve is left in position X then oil flowing through valve 8a is blocked by the delivery valve of the pump and pressure builds up on the pilot of valve 8 sufficient to open it and allow oil to flow to the reservoir.

The resilient mounting of the cab on the vehicle frame and the disposition and connection of the ram between the frame and the cab are preferably the same as in said U.S. Pat. No. 3,972,557, to which reference is made as part of the present disclosure.

Referring now to the present invention there is interposed in the line 6 to the upper end of the ram a two-position auxiliary valve 10 normally held in the closed position by detent mechanism indicated generally at 11, the valve also being responsive to pressure in the line 6 such that when this pressure attains a predetermined value the valve is moved to the open position shown.

Assuming now that the cab is to be raised the control valve 5 is set to position X, the valve 10 is set to block the line 6 to the upper end of the ram and is held by the detent in this position, and the hand pump 1 is then operated to cause fluid to be transferred from the reservoir through lock valve 8a into the lower end of the ram. Pressure fluid now fills the whole of the float zone and acting differentially across the ram piston raises the piston to the end of the float zone and into the operating zone. As the ram makes sealing engagement with the smaller cylinder bore pump pressure will continue to raise the piston and pressure will build up above the piston until a predetermined pressure level is reached whereby the valve 10 opens and the ram thereafter raises the cab in the normal manner, fluid from the upper end of the ram flowing via valves 10 and 5 back to the reservoir. The pressure level to overcome the detent 11 and open valve 10 is lower than the pressure setting of the relief valve 1a.

To return the ram piston to the lower end, the control valve 5 is put into position Y and the pump is operated to pass fluid through valve 10 and lock valve 8 into the rod end of the ram, pressure build-up between valve 8 and the ram piston opening lock valve 8a and allowing fluid to pass from the lower end of the ram through said valve and valve 5 back to the reservoir. The system is arranged such that when the ram piston enters the portion of the cylinder of increased diameter this is coincident with the vehicle cab contacting the spring suspension on the vehicle. Fluid flows around the ram piston and pressurises the whole of the ram cylinder, the pressure opens valve 8a, fluid passes to the reservoir and the ram falls at controlled speed to take up an equilibrium position on the spring suspension.

If valve 10 were inadvertently operated to block the line 6 to valve 8 the action of the ram would quickly build up a pressure in that line sufficient to overcome the detent and return the valve to the free flow condition.

Figure 2:
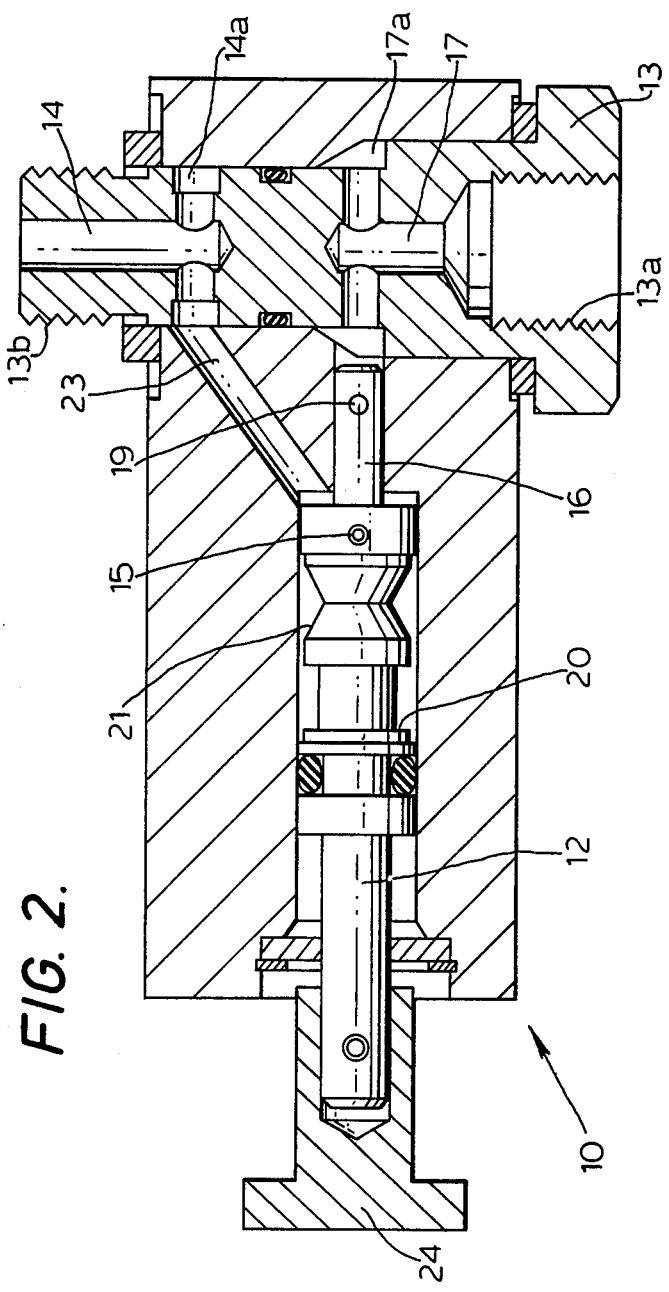
FIG. 2 is a vertical cross sectional view of a practical embodiment of the auxiliary valve.
Figure 3:
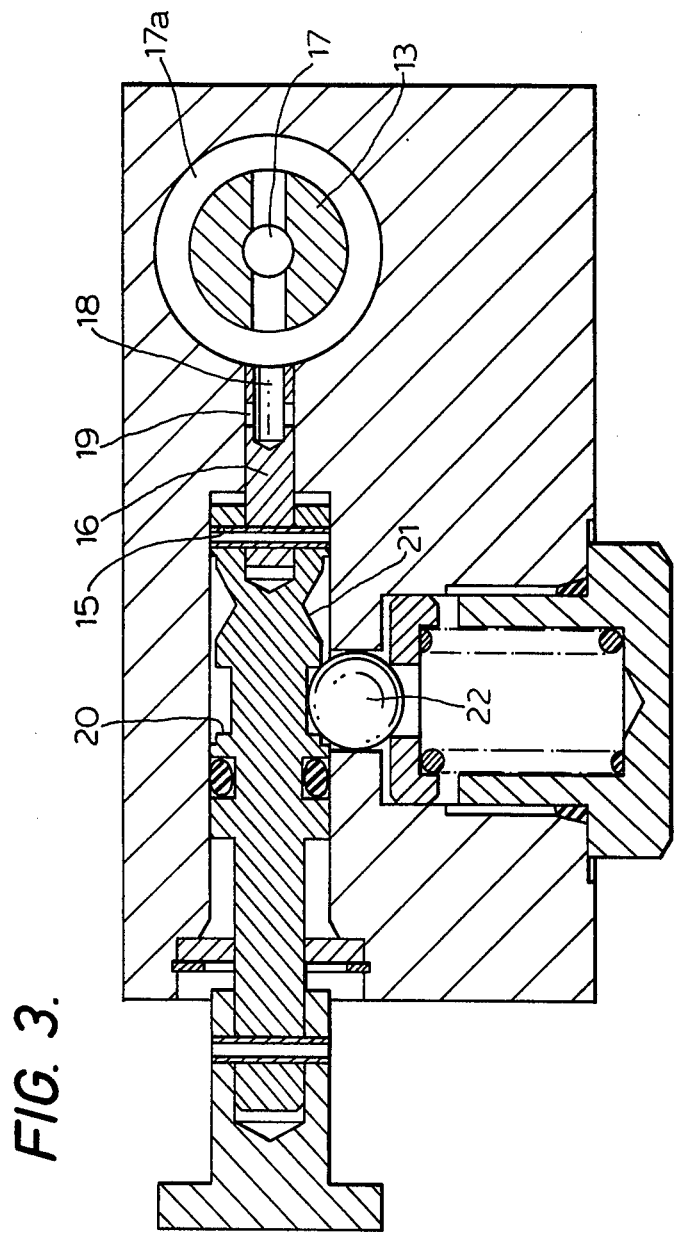
FIG. 3 is a horizontal sectional view of said valve.

Referring now to FIGS. 2 and 3, the housing of the valve 10 is bored to receive a plug 13 one end of which is socketed as at 13a to receive a fitting on conduit 6 leading to the upper end of the ram whilst the other end of the plug is screw-threaded as at 13b for direct engagement with or a conduit connection with a port of the associated pump reservoir. The socketed end of the plug has a blind axial bore 17 connected by cross ports to an annular chamber 17a whilst at the other end of the plug a similar bore 14 is connected by cross ports to a further annular chamber 14a. Located in a chamber extending perpendicularly to the axis of plug 13 is a spool element 12 having at one end thereof a plunger 16 sliding in a bore communicating with the annular chamber 17a, the plunger being connected at one end to the spool element by a pin 15 fitted freely in the plunger and being formed at the other end with an axial bore 18 terminating in a cross passage 19. Intermediate its ends the spool element is grooved as shown at 20 to receive a spring-loaded ball or equivalent detent 22 for holding said element in the closed position, and said element may also embody a V-groove 21 for co-acting with the detent to retain said element in a displaced position. A passage 23 connects the spool chamber to the annular chamber 14a and it will be seen that to raise the ram the auxiliary valve 10 is set to the condition shown in the drawings where communication between the bore 14 and 17 is interrupted, the spool element having a hand knob 24 on one end for manual manipulation when necessary. As pressure builds up above the ram piston as previously explained, it is transmitted to the end face of plunger 16 and when said pressure reaches a predetermined value it displaces the spool element to the left, overcoming the restraining action of the detent 22. The degree of displacement of the spool element is determined by engagement of the detent in V-groove 21 and in this position the cross passage 19 in plunger 16 is uncovered and the conduit from the upper end of the ram is connected to the pump reservoir via the bore 17, annular chamber 17a, bore 18, spool chamber, passage 23, annular chamber 14a and bore 14.

I claim:

1. In a hydraulic ram system for tilting the cab of a commercial vehicle, which cab is resiliently mounted on the vehicle frame or chassis, and wherein the end of the ram cylinder in which the ram piston is located when the cab is in the lowered position is of increased bore diameter to provide enough clearance around the piston to render the ram passive in this position, the length of the increased cylinder bore being sufficient to accommodate the maximum movement of the cab on its suspension, the improvement wherein there is provided in the line to the upper end of the ram cylinder an auxiliary valve which is adapted to be held by a spring-loaded detent in the closed position and the arrangement being such that when a predetermind pressure is reached in the upper end of the ram cylinder during a cab lifting operation and occasioned by the entry of the ram piston into the smaller diameter end of said cylinder, said pressure acting on the valve overcomes the spring-loading on the detent and moves the valve to the open position.

2. A hydraulic ram system as claimed in claim 1, wherein the detent means has a second operative position in which it holds the valve in the open position, means being provided for manually resetting the valve.

3. A hydraulic ram system as claimed in claim 1 and in which a pressure relief valve is provided in association with the system pump, wherein the spring-loading of the detent is such that the pressure level to overcome the detent and open the auxiliary valve is lower than the pressure setting of said relief valve.

* * * * *